Dec. 7, 1971    G. F. RITTER, JR    3,625,670
GLASS SHEET BENDING METHOD AND APPARATUS
Filed Nov. 5, 1969    2 Sheets-Sheet 1

INVENTOR.
George F. Ritter, Jr.
BY Collins & Oberlin
ATTORNEYS

United States Patent Office 3,625,670
Patented Dec. 7, 1971

3,625,670
GLASS SHEET BENDING METHOD AND APPARATUS
George F. Ritter, Jr., Toledo, Ohio, assignor to Libby-Owens-Ford Company, Toledo, Ohio
Filed Nov. 5, 1969, Ser. No. 874,332
Int. Cl. C03b 23/02
U.S. Cl. 65—106                          7 Claims

ABSTRACT OF THE DISCLOSURE

A method of press bending glass sheets which employs an apparatus including mold members supported for movement toward and away from one another and having complemental, curved shaping surfaces, means for conveying flat glass sheets along a path above said mold members with a pivotal section adapted to locate a glass sheet between the mold members and to remove the same after the bending operation.

The present invention relates broadly to the bending of glass sheets and more particularly to an improved method and bending apparatus by which such method can be accomplished.

The primary object of the invention is to provide such improved procedures and bending apparatus in which mold members, having oppositely disposed complemental shaping surfaces, are moved toward and away from one another to press a heat-softened glass sheet between the shaping surfaces, and conveying means having a pivotally mounted section that is swung into and out of conveying position to locate a sheet between said mold members and then remove the bent sheet.

Another object of the invention is to provide such improved bending apparatus including means for conveying glass sheets along a substantially horizontal path of movement above a pair of spaced mold members having complemental shaping surfaces located in angular relation to said horizontal path of movement with a section of said conveying means being pivotally mounted to carry a sheet from said horizontal path and locate the sheet between the mold members.

A further object of the invention is to provide in bending apparatus of the above character means for conveying glass sheets along a substantially horizontal path of movement and for pivotally locating the sheets in a plane angularly disposed to said path, for moving a pair of mold members from positions of spaced relation toward one another to press the sheet therebetween and then remove the mold members and return the bent sheet for movement along said horizontal path on the conveying means.

Other objects and advantages of the invention will become more apparent during the course of the following description when read in connection with the accompanying drawings.

In the drawings, wherein like numerals are employed to designate like parts throughout the same:

Figure 1:
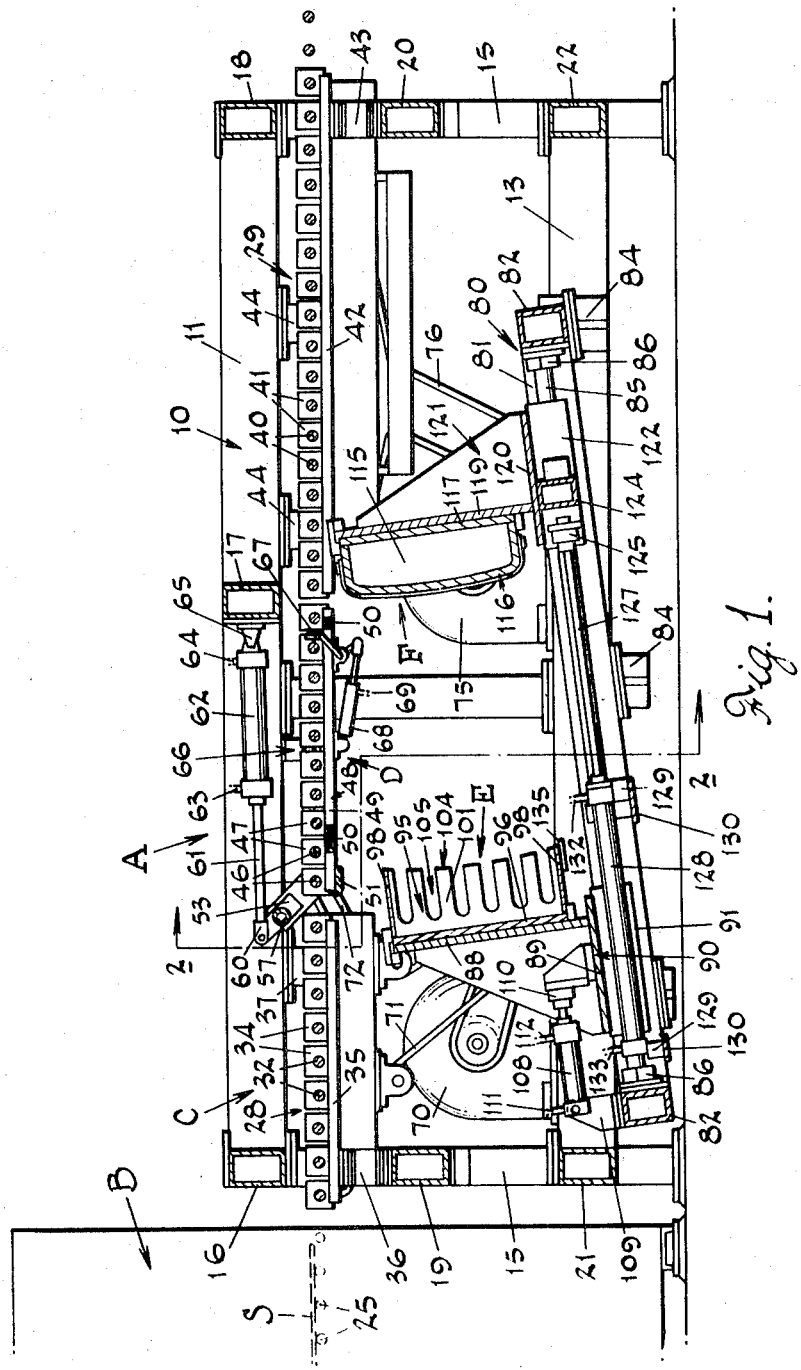
FIG. 1 is a side elevation, partially in section, of a conveying and bending apparatus constructed in accordance with the present invention.

Referring now more particularly to the drawings, there is shown in FIG. 1 a bending apparatus, generally designated by the letter A, that is located in aligned position to the exit end of a furnace B to receive properly heated glass sheets S therefrom. The sheets are carried on a conveyor system C onto a pivotally mounted conveyor section D thereof that is adapted to locate a glass sheet in an inclined plane between the elements by which it is to be bent. When the sheet is disposed in the inclined plane, one bending mold member E is advanced to carry the sheet toward an oppositely advancing mold member F. Upon completion of the bending action, the bent sheet is again received on the pivotally mounted conveyor section D, returned to the plane of the conveyor system C, and carried thereby into a tempering or annealing zone as desired.

The bending apparatus includes a framework 10 with upper and lower pairs of longitudinally disposed bars 11–12, 13–14, respectively, connected at their ends to posts 15 arranged in the corners of the framework. The posts 15 are interjoined by transversely disposed and vertically spaced bars 16 to 22, inclusive.

The framework 10 is equipped with the roll conveyor system C on which heated glass sheets S are received from the rolls 25 of the furnace B. The conveyor system C has an entry section 28, the pivotally mounted section D and run-out section 29; said entry section 28 and run-out section 29 each being fixedly supported on the framework. Thus, the shafts of rolls 32 of the entry section 28 are journaled at their respective ends in bearings 34 secured to support members 35 which are mounted by brackets 36 on the transverse bar 19 and at their ends adjacent the pivotal section D by brackets 37 attached to the longitudinal bars 11–12.

Similarly, the shafts of rolls 40 of run-out section 29 are journaled at their ends in bearings 41 carried by support members 42 that are mounted at one of their respective ends by brackets 43 on the transverse bar 20 and at their other ends by brackets 44 attached to the longitudinal bars 11–12.

Figure 2:
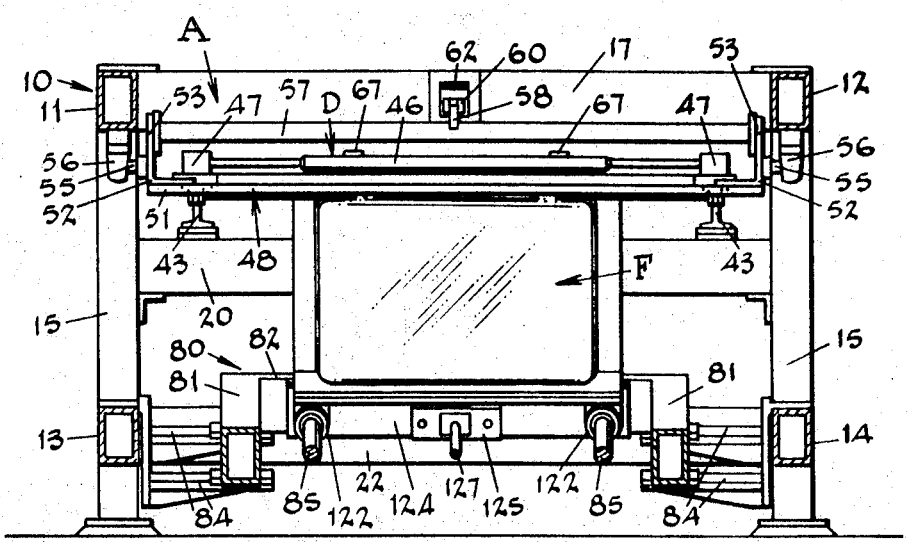
FIG. 2 is a transverse vertical section taken on the plane of line 2—2 of FIG. 1.

The shafts of rolls 46 of the pivotal section D are journaled at their ends in bearings 47 on a frame 48 of which the support members 49 are interjoined by transversely disposed bars 50. An end bar 51 is fixed to plates 52 (FIG. 2) forming the support portions of levers 53. These levers have stub axles 55 that are adapted to swingably mount the frame at bearings 56 secured to the undersurfaces of the bars 11 and 12. The levers 53 are connected at their free ends by a bar 57 which has a lug 58 in its medial area. The lug is operatively associated with a clevis 60 at the end of a piston rod 61 of a cylinder actuator 62, having supply pipes 63 and 64. The cylinder 63 is mounted at its head end on a bracket 65 secured at the transverse frame bar 17. The application of pressure by pipe 63 to the rod end of cylinder 62 to produce downward movement of the conveyor section D is controlled by a photoelectric cell system, generally designated by the numeral 66. This system is activated when the "beam" is interrupted by the leading end of a sheet.

Locator stops 67 are provided at the free end of the frame 48 of section D to be engaged by the leading edge of a glass sheet. The stops 67 are maintained in sheet engaging position by cylinder actuators 68 containing flexible self-reversing elements. After activation of the photoelectric cell system 66, swinging motion of the frame 48 is controlled so that as it approaches a selected inclined plane, as for example of about 23°, the sheet will have arrived at a point at which it will engage the locator stops 67. Thus, as the frame passes through said inclined plane and continues to move downwardly, the sheet will remain in a static position or one of "repose."

The locator stops are thus adapted to support the sheet as the frame 48 is being swung downwardly to the inclined position in which the sheet is to be pressed. When the frame has been returned upwardly to the substantially horizontal position, as in FIG. 1, the stops 67 are swung downwardly or lowered by the cylinders 68 to permit forward movement of the bent sheet onto the rolls of run-out conveyor section 29. This action is produced by application of pressure by pipes 69 to the rod ends of the cylinders.

Generally stated, the rolls 35 of the entry section 30 and rolls 46 of the pivotal section D are driven from a power source, such as the motor 70, by means of sprocket chain belt 71. This chain drives sprockets (not shown) on the shafts of rolls 35 and a sprocket chain belt 72 entrained about sprockets on the shafts of rolls 46. On the other hand, sprockets (not shown) on the shafts of rolls 42 of the run-out section 29 are driven from a motor 75 by means of the sprocket chain belt 76.

With reference now to the bending mold members E and F, it will be seen that they are movably mounted on a substantially rectangular frame 80, formed by longitudinal side bars 81 and transverse end bars 82, and supported by suitably disposed brackets 84, on the longitudinally disposed bars 13 and 14 of the framework 10. As is customary in press bending flat articles, such as sheets of glass, one or the bending member E has been formed with a frame of concavely-shaped surfaces while the other bending member has been provided with a single convexly-shaped surface. In this way, when a heated glass sheet is interposed and pressed between the two mold members, it will be bent to a desired curvature due to the action imposed by the mold members. As herein provided, the mold members E and F are supported on the framework 80 for sliding movements toward and away from one another by means of individually controlled sources of power.

Thus, a pair of cylindrical guide rods 85 are arranged in equally spaced, parallel relation to the longitudinal axis of the bending apparatus A and are supported at their respective ends by mounting collars 86 on the transverse frame bars 82. The mold member E is bodily carried on the substantially vertically disposed wall 88 of the platform 89 of a carriage 90 which is adapted to traverse the guide rods 85. At each of its ends, the platform 89 is equipped with tubular elements 91 in which sleeve bearings are received to mount said carriage on the guide rods 85. The mold member E, for the purpose of this invention, includes a four-sided wall structure 95 having an integral mounting panel 96 by which it is suitably secured on the wall 88. The upper and lower walls 98 have relatively flat outwardly directed edge surfaces while the edge surfaces of the side walls 101 are finished to the curvature to which a glass sheet is to be bent and, with the edges of the walls 98 and 101 defining the actual shaping surface 104. To permit relative movement between the mold member E and the rolls 46 of the pivotal conveyor section D, as will later be explained, the side walls 101 are provided with inwardly directed slots 105.

The carriage 90 is moved along the guide rods 85 by means of a cylinder actuator 108 mounted at its head end by a bracket 109 on the transverse bar 82 of the framework 80. The piston rod of the cylinder 108 is connected by a clevis member to a bracket 110 on the platform 89. The cylinder receives pressure at its head end by pipe 111 to move the mold member E toward the complementary mold member F and to retract said member during application of pressure to the rod end by pipe 112.

Figure 3:
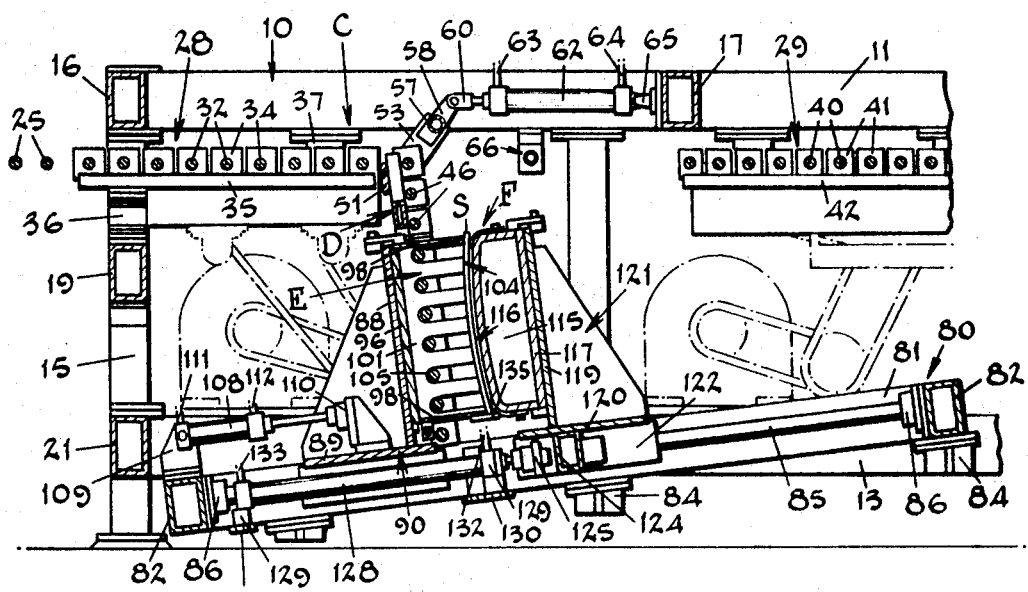
FIG. 3 is a view similar to FIG. 1 but with the bending members of the apparatus in closed position.

Although not restricting the spirit of the invention to a particular structure for the mold member F, it can, by way of example, be formed with a hollow body portion 115 of a rigid, castable material; having a major curved wall 116 that is covered with a suitable resilient, heat-resistant material such as glass cloth. The body 115 is mounted by a base-plate 117 that is fixed to the substantially vertically disposed wall 119 of the platform 120 of a carriage 121. This platform 120, similar to the platform 89, has sleeve bearings contained in integral tubular elements 122 for sliding movement on the guide bars 85. In the structure of the platform 120, a bar 124 is provided in transverse relation between the elements 122 with suitable cylinder connector means, designated by the numeral 125, being mounted in the medial area of the bar. Said connector means is attached to the piston rod 127 of a cylinder actuator 128. This cylinder is carried by mounting blocks 129 on bars or plates 130 fixedly to the longitudinally disposed bars 81 of the framework 80. As viewed in FIGS. 1 and 3, when pressure by pipe 132 is directed into the rod end of cylinder 128, the mold member F will be moved toward the member E and away from the opposed member when pressure is applied to the head end of the cylinder by pipe 133.

MODE OF OPERATION

A suitably heat-softened glass sheet S from the rolls 25 of the furnace B is received on the rolls 32 of the entry conveyor section 28 and thereby advanced onto the rolls 46 of the pivotally mounted section D. When the leading edge of the sheet interrupts the beam to the photoelectric cell system, it activates a control system which, after a selected interval of time, causes pressure to be applied by the pipe 63 to the rod end of cylinder 62 which retracts the piston rod 61. This operates, through the levers 53, to swing the frame 48 of section D downward to the selected inclined plane as the leading edge of the glass sheet comes to rest in engagement with the locator stops 67. As the frame approaches the desired position for the bending operation and the several conveyor rolls 46 enter in the slots 105, it is contemplated that the pressure in pipe 63 will be restricted or otherwise reduced, to decrease motion of the frame 48 before it is halted.

In carrying out the actual bending operation, the mold members E and F are caused to move toward each other; first, until the member E receives the sheet S on support tabs 135, affixed to the lower mold wall 98, from the locator stops 67 on the frame 48; and then (FIG. 3) until the glass sheet is bent as it is pressed by the convex surface 116 of the mold member F against the shaping surface 104 provided on the walls 98 and 101 of the mold member E.

To accomplish this, pressure is applied by pipe 111 to the head end of cylinder 108, causing the carriage 90 to traverse the guide rods 85 and the mold member E thereon to remove the glass sheet from the rolls 46 of the pivotally mounted conveyor section D and support the said sheet on the tabs 135. The carriage 90 is thus intended to be moved from a position substantially as illustrated in FIG. 1 to a position as in FIG. 3. As noted earlier and during forward movement of the carriage 90 and mold member E, the rolls 46 of the conveyor section D are received in the slots 105 provided in the side walls 101 of the member. Substantially simultaneously, pressure by pipe 132 is applied to the rod end of the cylinder 128 to produce movement of the carriage 121 and mold member F until opposed movements of the mold members, as in FIG. 3, produces bending of the glass sheet as it is pressed therebetween.

Upon direction of pressure by pipe 112 to the rod end of cylinder 108 and by pipe 133 to the head end of the cylinder 128, the mold members are returned to their original positions of spaced relationship. During this movement of the carriage 90 and member E, the bent sheet is supported on the tabs 135 and carried rearwardly until it is received against the locator stops 67 and on the rolls 46 of the pivoted conveyor section D which then is swung upwardly. This motion is obtained by pressure through pipe 64 to the head end of cylinder 62.

Now, when the section D is again located in a substantially horizontal plane common to both the entry conveyor section 28 and the run-out section 29, pressure by pipes 69 to the rod ends of the cylinders 68 operates to lower the stops 67 thereby releasing the sheet for movement onto the rolls 40 of said run-out conveyor section 29.

I claim:

1. In a method of heat treating glass sheets, the steps of supporting such sheets in a substantially horizontal plane for movement along a definite path, heating said sheets during said movement and while so supported, swinging said sheets from said substantially horizontal plane into a substantially vertical plane and press bending said heated sheets to a desired curvature while in said substantially vertical plane.

2. A method as defined in claim 1, in which said heated sheets are swung downwardly into said substantially vertical plane, said bent sheets are swung upwardly into and supported in said substantially horizontal plane for further movement along said path, and said bent sheets are cooled while so supported and during said further movement.

3. Apparatus for heat treating glass sheets comprising a conveyor made up of a plurality of sections for supporting heated sheets in a substantially horizontal plane for movement along a predetermined path, one of said sections of said conveyor being mounted for swinging movement downwardly relative to an adjacent section into a substantially vertical plane, means for selectively swinging said one section between said substantially horizontal plane and said substantially vertical plane, means on said swingable conveyor section for supporting an edge of said glass sheets when in said substantially vertical plane, and bending means comprising first and second mold members disposed at opposite sides of said substantially vertical plane and movable relative to said glass sheets and to said swinging conveyor section when the latter and the glass sheets supported thereon are in said substantially vertical plane thereby to engage said sheets and shape same into a desired curvature.

4. Apparatus as defined in claim 3, in which said edge supporting means is also adapted to interrupt movement of said glass sheets over said swingably mounted conveyor section, and means is provided for moving said means into and out of said supporting and interrupting positions.

5. Apparatus as defined in claim 3, in which one of said mold members is provided with recesses in its mold face for receiving portions of said swingably mounted conveyor section when said section is swung away from said path.

6. Apparatus as defined in claim 5, in which said recessed mold member is movable to an extent sufficient to remove said glass sheets from said swingably mounted conveyor section during relative movement between said mold members and said sheets to bend said sheets, and means is provided on said recessed mold member for supporting the lower edges of said sheets during and after said removal.

7. Apparatus as defined in claim 6, in which both of said mold members are mounted for movement toward and away from one another along a path at a slight angle to the horizontal, and means are provided for independently moving said mold members.

References Cited
UNITED STATES PATENTS

| | | | |
|---|---|---|---|
| 2,370,381 | 2/1945 | Vaughan | 65—273 X |
| 2,850,844 | 9/1958 | White | 65—106 |
| 3,290,136 | 12/1966 | Thomas | 65—106 X |

ARTHUR D. KELLOGG, Primary Examiner

U.S. Cl. X.R.

65—273, 275; 289